Oct. 2, 1962   E. W. RUSS   3,056,893
PORTABLE ELECTRIC SUPPLY MEANS
Filed Dec. 11, 1959
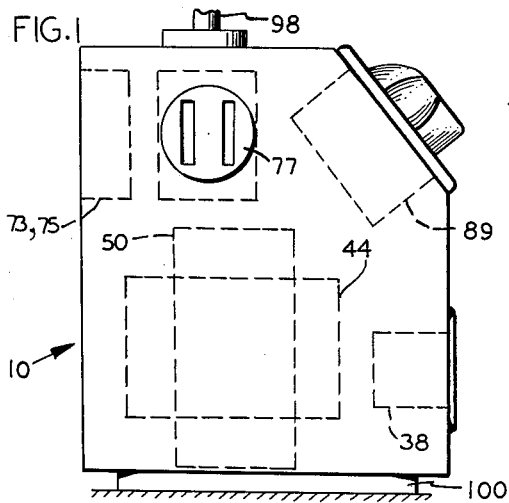
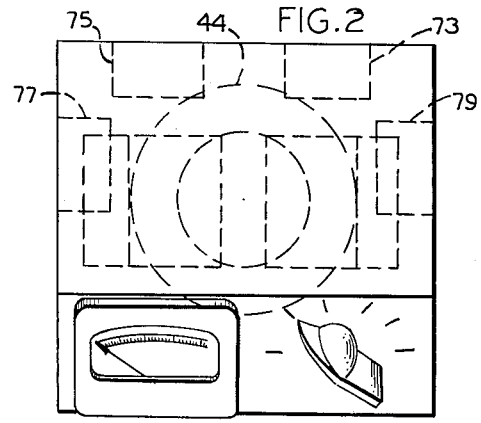
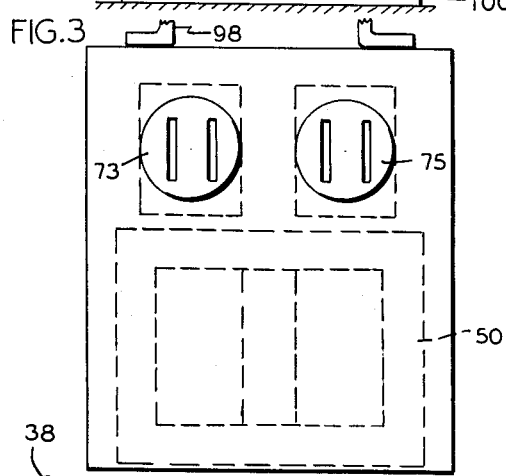
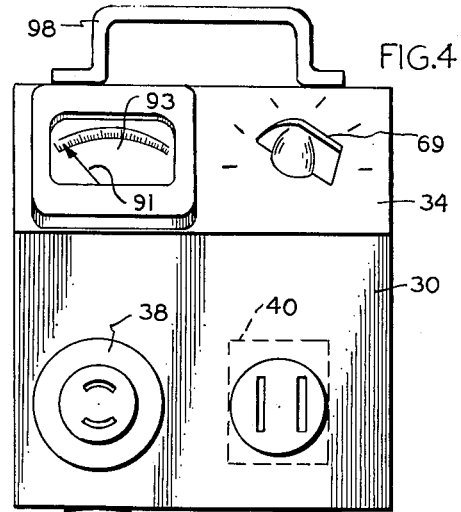
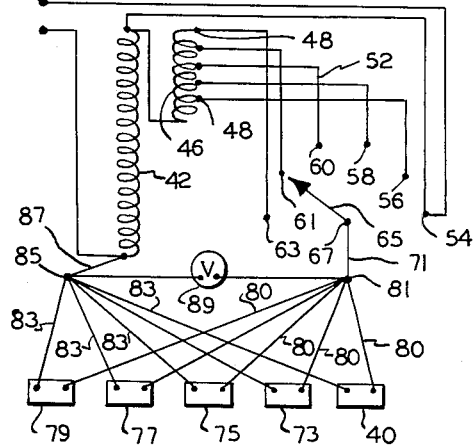
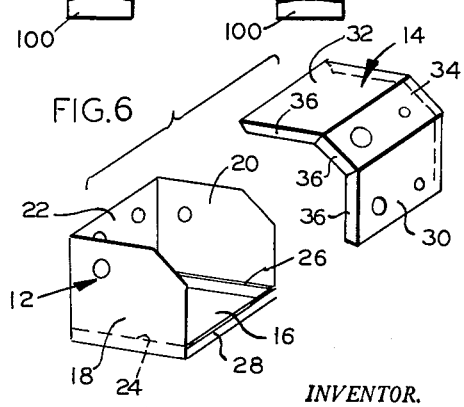
INVENTOR.
EVART W. RUSS
BY WILSON, LEWIS & McRAE
ATTORNEYS 3,056,893
PORTABLE ELECTRIC SUPPLY MEANS
Evart W. Russ, 3562 S. Lapeer Road, Mettamora, Mich.
Filed Dec. 11, 1959, Ser. No. 858,909
1 Claim. (Cl. 307—150)

This invention relates to a device in the nature of a portable box or the like having an electrical power inlet and at least one electrical outlet thereon, together with energy transfer means within its interior for supplying electrical current to loads remote from a source of power. The invention has particular application in the building construction field and other similar outdoor areas wherein electrically operated tools and devices are utilized remote from a source of current.

In installations of the above-mentioned type a problem often arises by reason of the fact that the current for the various tools must be carried through an excessively long supply conduit, e.g., one hundred feet or more in length, and such excessively long supply conduits tend to cause a voltage drop along the conduit so that the voltage supplied to the tools is substantially less than that at the source of electric energy, such as the household electrical outlet. The current supplied to the tools or other load is thereby of relatively high amperage and low voltage, such that the load devices fail to operate or operate at less than maximum efficiency, the result being annoyance on the job and/or relatively short service life of the job equipment.

With the above discussion in mind, it is a principal object of the present invention to provide a device in the nature of a portable electrical box having an electrical inlet and at least one electrical outlet, together with energy transfer means within the box interior for supplying current of a proper voltage to the outlet terminals.

An additional object of the invention is to provide a box of the above-mentioned character having means for raising its input voltage by varying amounts under the control of the user, the arrangement being such that the box outlet voltage can be held at a desired adjusted level irrespective of varying and substantial voltage drops taking place between the household current supply and the portable box.

A further object of the invention is to provide a portable electric box of the above-mentioned character which can be adjusted by the user quickly and easily in response to such fluctuation in input voltage as may take place during th period of use of the device.

An additional object of the invention is to provide a portable electric box having an easily viewable dial structure thereon for enabling the user to quickly ascertain the voltage condition at the outlet terminals.

Another object of the invention is to provide a portable electric box which is of relatively compact construction and which may be easily carried to and from its site of use.

An additional object of the invention is to provide such a portable electric box having a plurality of electrical outlets located on different ones of the box side walls so that the box may be placed in a central location in a building site and connections made with various cables from the saws, drills, etc., without tangling of the cables together or winding of the cables around corners of the box.

In connection with the immediately preceding object, a more general object is to provide an electric box construction having a plurality of outlets all readily accessible for connection of electrical conductors therewith.

A still further object of the invention is to provide a portable electric box for supplying current of adjusted voltage, wherein the box can utilize standard electrical components now on the market, thereby enabling manufacturers to enjoy the benefits of the invention without substantial tooling costs.

A still further object of the invention is to provide a portable electrical box having a number of components, including an electrical power inlet, a plurality of electrical outlets, a voltmeter, a transformer, and a manually actuable switch, said components being arranged compactly with respect to one another so as to provide a relatively small box construction which can be manufactured at relatively low cost.

In connection with the immediately preceding object, it is a further object to provide an arrangement wherein the various components may be electrically interconnected at relatively low cost.

Other objects of this invention will appear in the following description and appended claim, reference being had to the accompanying drawings forming a part of this specification wherein like reference characters designate corresponding parts in the several views.

In the drawings:

FIGURE 1 is a left side elevational view of one embodiment of the invention;

FIG. 2 is a top plan view of the FIG. 1 embodiment with a carrying handle structure therefor disconnected for purposes of better illustrating the interior components of the embodiment;

FIG. 3 is a rear elevational view of the FIG. 1 embodiment;

FIG. 4 is a front elevational view of the FIG. 1 embodiment;

FIG. 5 is a diagrammatic showing of the electrical circuitry employed in the FIG. 1 embodiment; and FIG. 6 is an exploded view of a two-piece casing structure utilized to form the box of the FIG. 1 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, there is disclosed a portable electrical box 10 including a casing member 12 and a second casing member 14, both of said casing members being preferably formed of sheet metal and being connected together by sheet metal screws for permitting said casing members to be separated from one another in the event one or more of the electrical components therein must be repaired or replaced.

Casing member 12 defines a bottom wall 16, left side wall 18, right side wall 20, and rear wall 22. Bottom wall 16 is provided with the two upstanding flanges 24 and 26 which permit it to be rigidly connected to the upstanding side walls 18 and 20, preferably by sheet metal screws (not shown). The front edge portion of bottom wall 16 is provided with an upstanding flange 28 which permits it to be connected with the front wall 30 formed by casing member 14, also preferably by sheet metal screws (not shown).

Member 14 also defines a box top wall 32 and an angularly inclining wall 34, each of the three walls 30, 32 and 24 having a flange 36 at each of its lateral edges for securement of member 14 in position on casing member 12. Connection of the flanges with the various casing member 12 walls is preferably effected by sheet metal screws.

Front wall 30 mounts the conventional electrical inlet 38 and the conventional electrical outlet 40 which may be constructed as shown in Patents 2,262,712, 2,317,382 or Re. 21,743. As shown in FIG. 5, inlet 38 connects with the primary winding 42 of the transformer coil 44. The transformer secondary 46 of the primary is connected in series with the primary as shown in FIG. 5 and is provided with a series of electrical taps at 48 for producing different step-ups in voltage from the voltage supplied to the transformer primary through inlet 38.

As shown in FIGS. 1 through 3, the transformer is provided with the upstanding magnetic frame 50 for cooperation with the coil 44 to produce the desired step-up in voltage to the various taps 48. Each of the taps 48 is connected with a conductor 52 for connection at its opposite ends with one of the respective contacts 54, 56, 58, 60, 61 or 63.

It will be appreciated that in use of the illustrated box construction the user will employ it at some distance from a source of electrical energy, as for example the conventional household outlet, and that a relatively long length cable will be necessary to connect the source of energy with the power inlet 38. Such a long cable length produces a drop in voltage therealong such that the voltage at the inlet 38 may be substantially less than the conventional household voltage. Primary 42 and secondary 48 will cooperate with the frame 50 to produce varying step-ups in voltage to the various contacts 54 through 63. The contacts are arranged as part of a conventional switch structure having the switch element 64 thereon pivotally mounted at 67. This switch structure is preferably a standard item readily purchaseable on the market, and the details thereof have therefore not been shown in the drawings. The construction of this switch may correspond to that shown in U.S. Patents 2,040,278 and 2,163,919.

The switch structure is of course contained within its own casing which is carried on the back surface of inclined wall 34, the switch arm 65 thereof being connected with a rotary shaft which extends through wall 34 and carries the manually actuable knob 69, the arrangement being such that manual rotation of knob 69 is effective to rotate the switch arm 65 to selected ones of the contacts 54 through 63. Arm 65 is suitably connected with a conductor 71 which extends within the box 10 to a central point between different ones of the various electrical outlets 40, 73, 75, 77 and 79 arranged on various ones of the box side walls 30, 22, 18 and 20. Each of these outlets may be constructed as shown in U.S. Patents Re. 21,743, 2,262,712 or 2,317,382. As will be seen from FIG. 5 one terminal of each of these outlets is provided with a line 80 which connects at a juncture 81 with the aforementioned line 71. Preferably each of the various lines 80 are of approximately the same length and each is connected with line 71 (by soldering or the like) to form the juncture 81 at a central point located in the space above the transformer frame 50. By this arrangement the various components can be electrically connected together with a minimum quantity of wiring and with a minimum number of connections in the manufacturing operations.

The other terminals of the electrical outlets are connected with lines 83, which lead to a juncture 85 with another line 87 extending from the primary winding 42 of the transformer. Lines 83 are each preferably of substantially the same length and form the juncture 85 at a central point located in the space above transformer frame 50. The arrangement of lines 80 and 83 with respect to one another and the other components is such that each of the outlets is in parallel with one another and in series with the line 71. Thus the voltage supplied through line 71 is available to each of the outlets. As indicated above, the step-up in voltage achieved with the transformer is dependent on which of the various taps 48 are placed in circuit, as controlled by switch arm 65.

In use of the apparatus, if the loss in voltage through the supply line is relatively heavy then the switch arm 65 will be moved by the user to connect with one of the contacts 60, 61 or 63 to provide a relatively large step-up in voltage from that supplied to the inlet 38. It is of course desired that the voltage at each of the outlets be substantially the same whatever the length of the supply cable, and in general when relatively long supply cables are necessary the bridging element 65 will be switched to one of the contacts 60, 61 or 63. Similarly, when a relatively short supply cable is utilized the bridging element 65 is preferably switched to one of the contacts 54, 56 and 58 for adjusting the voltage at the various outlets.

In order that the outlet voltage be insured of being adjusted to the correct value there is provided in the box circuit a voltmeter 89 having the lead wires therefore connected to the junctures 81 and 85 so as to place the voltmeter in parallel with each of the outlets. The arrangement is such that voltmeter 89 senses the voltage condition at each of the outlets, with the voltage condition being noted by a deflectable pointer 91 located in front of the conventional dial structure 93. Various voltmeter constructions may be employed in the practice of the present invention, and therefore no details of the voltmeter are shown in the drawings. An illustrative example of a useful voltmeter construction is shown in U.S. Patent 2,433,165.

The box construction may be made in various different sizes, but for purposes of manufacturing economy the box is preferably built as a relatively compact unit having a height, width and depth of approximately eight inches or less. Such a construction is relatively easy for the user to handle for transport purposes. In order to make for even easier handling the box may be provided with the carrying handle 98. It will be noted from FIG. 1 that handle 98 is located substantially directly above the transformer frame 50. The transformer is a relatively heavy component, and the weight of the box is concentrated at the center of the transformer. By mounting the carrying handle 98 in the position shown in FIG. 1, the user is enabled to easily carry the portable box in an upright condition from place to place without tipping of the box or bumping of the box against his knee or leg during transport. At the site of use the box may be readily lowered to the subsurface so as to have the skids 100 thereof seat the box in a stable position without any deformation or warping of the box walls by contact with uneven surfaces.

When the box is seated at the site of use, the lead-in cable is plugged into the inlet 38 and the voltage condition noted by the position of pointer 91. If the voltage condition across the outlet terminals is below that desired, as for example 110 volts, the switch actuator 69 is rotated successively to the various contacts 56, 58, 60, 61 or 63 until the voltage comes up to the desired value. The various tools or other load devices utilized at the site may then have their extension cords plugged into the various outlets 40, 73, 75, 77 or 79, so as to be operated at the desired voltage. If during the period of use the input voltage at inlet 38 should vary then the condition will be noted by pointer 91, and the knob 69 can be suitably rotated to adjust the outlet voltage back to the desired value.

It will be noted that the illustrated box has at least one outlet on each of its four upstanding walls. By this arrangement the user can readily plug the extension cords for his load devices into a selected one of the outlets without undue interference with adjacent extension cords or undue tangling of the cords about one another and about the box.

It will also be noted from FIG. 1 that the transformer is located in the lower portion of the box slightly closer to wall 22 than to wall 30 so as to permit a sufficient clearance space for the inlet 38 and outlet 40. The various outlets 73, 75, 77 and 79 are arranged above the upper limit of the transformer so as to be out of interference therewith and permit the portable box to be constructed as a relatively small size, low cost structure. As previously indicated, the space directly above the transformer can be conveniently utilized for the various wires 80 and 83, and the junctures 81 and 85. The inclined character of wall 34 is such that dial 93 may be readily viewed by the user whether the box is placed relatively high (as on a shelf) or relatively low (as on the floor).

The drawings illustrate one embodiment of the invention which has been found to serve particularly well for the intended purpose, but it will be appreciated that various modifications and rearrangements of the illustrated construction may be resorted to without departing from the spirit of the invention as defined in the appended claim.

I claim:

A device for supplying A.C. power at a desired voltage to loads remote from a power source and wherein the voltage drop over the power line from the source of power to the device is of considerable magnitude, comprising a manually portable unit including a box having a plurality of plug-in type outlets and a plug-in type inlet mounted in the walls thereof and accessible from the exterior of the box, a transformer disposed within said box, said plug-in type inlet being connected to the primary of the transformer, said plug-in type outlets being connected in parallel to the secondary of the transformer, a series of taps on the transformer secondary, each tap providing a different voltage, manually operable switch means actuatable to selectively interconnect all of the plug-in type outlets with different ones of the taps to provide the desired outlet voltage, and a voltmeter disposed within the box and connected to sense the voltage at the plug-in type outlets, said voltmeter having a dial structure visible exteriorly of the box to indicate the voltage at the plug-in type outlets.

References Cited in the file of this patent

UNITED STATES PATENTS

| Re. 23,797 | Miller | Mar. 19, 1954 |
| 1,954,931 | Hambuechen | Apr. 17, 1934 |
| 2,650,990 | Woodruff | Sept. 1, 1953 |
| 2,661,461 | Haury | Dec. 11, 1953 |